United States Patent [19]

Anderson et al.

[11] Patent Number: 5,057,174
[45] Date of Patent: Oct. 15, 1991

[54] FOAM TOOLING REMOVAL METHOD

[75] Inventors: Robert E. Anderson, Huntington Station; Leonard M. Poveromo, Northport, both of N.Y.

[73] Assignee: Grumman Aerospace Corporation, Bethpage, N.Y.

[21] Appl. No.: 547,371

[22] Filed: Jul. 5, 1990

Related U.S. Application Data

[63] Continuation of Ser. No. 306,185, Feb. 6, 1989, abandoned.

[51] Int. Cl.⁵ .......................... B24C 1/06; B24C 3/04
[52] U.S. Cl. .................................... 156/155; 156/197; 51/411; 264/317; 264/139
[58] Field of Search ............... 264/317, 221, 258, 257, 264/39, 139, 154, 162; 51/411; 156/153, 154, 155, 196, 197

[56] References Cited

U.S. PATENT DOCUMENTS

| | | | |
|---|---|---|---|
| 1,890,164 | 12/1932 | Rosenberger | 51/411 |
| 2,087,694 | 7/1937 | Malmros | 51/411 |
| 2,457,021 | 2/1950 | Sterns | 51/411 |
| 2,739,424 | 3/1956 | Fritze | 51/411 |
| 2,951,319 | 9/1960 | Kornhaus | 51/411 |
| 3,286,406 | 11/1966 | Ashworth | 51/411 |
| 3,914,815 | 10/1975 | Kobayashi | 51/411 |
| 3,965,233 | 6/1976 | Ritter | 264/317 |
| 4,314,427 | 2/1982 | Stoltz | 51/411 |
| 4,424,183 | 1/1984 | Nelson | 264/317 |
| 4,721,593 | 1/1988 | Kowal | 264/258 |

FOREIGN PATENT DOCUMENTS

| | | | |
|---|---|---|---|
| 2753030 | 5/1979 | Fed. Rep. of Germany | 51/411 |
| 810812 | 3/1959 | United Kingdom | 51/411 |

OTHER PUBLICATIONS

Wet Blasting Process for Cleaning and Finishing of Rubber Molds; by E. Anderson; Rubber Age; Apr. 1953, pp. 71-72.

*Primary Examiner*—Jay H. Woo
*Assistant Examiner*—Jeremiah F. Durkin, II
*Attorney, Agent, or Firm*—Pollock, VandeSande & Priddy

[57] ABSTRACT

A technique is provided for removing foam mandrel material from a stiffener section of a composite structural member as is employed in lightweight aircraft skin structures. The technique involves the direct pressure glass bead blasting of the mandrel material. By mounting a blasting nozzle within a rubber hose of larger diameter, an airstream containing glass beads may be directed outwardly through the nozzle while evacuating pressure is created in an annular passageway between the hose and the nozzle to evacuate mandrel foam particles as well as spent glass beads. The result is a clean channel within the stiffener section.

4 Claims, 1 Drawing Sheet

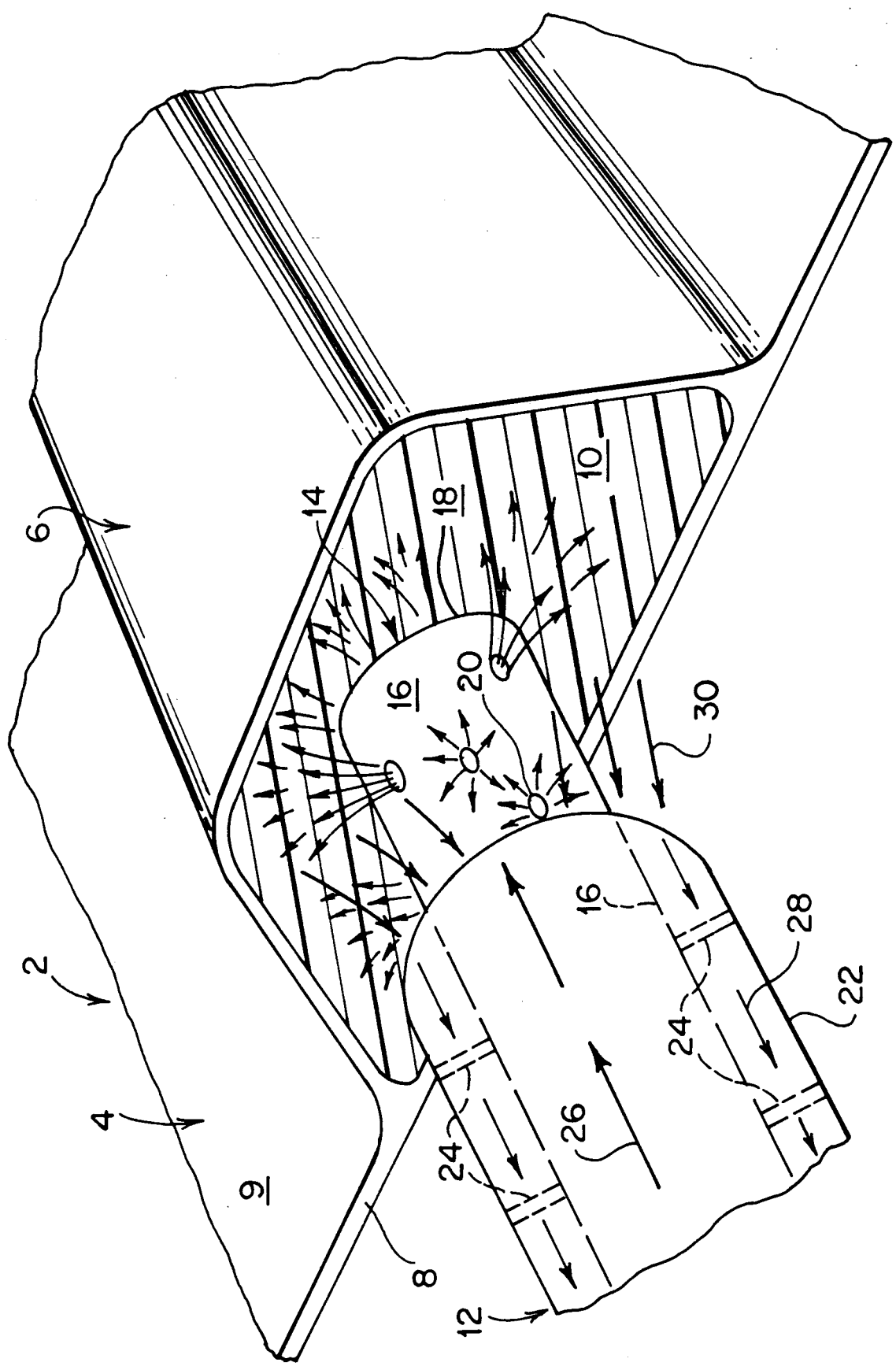

FOAM TOOLING REMOVAL METHOD

This application is a continuation of application Ser. No. 07/306,185, filed Feb. 6, 1989, now abandoned.

FIELD OF THE INVENTION

The present invention relates to metal working forms, and more particularly to a method for removing mandrel tooling from an integrally stiffened aircraft structure.

BACKGROUND OF THE INVENTION

During recent years lightweight composite materials have been employed for structural panel members, particularly for high performance aircraft. Although composite materials such as those containing graphite have a very high strength/weight ratio, in lightweight applications it is often necessary to include stiffeners along the length of composite panels. The prior art includes a number of fabrication approaches wherein thin resin pre-impregnated composite sheets are deposited one on top of the other. However, at regularly spaced intervals, a mandrel is positioned on the sheets so that it separates a base layer from overlying layers deposited on the base layer. The multi-layered composite sheets are then exposed to high pressure and temperature, such as in an autoclave until the resin of the impregnating material is cured. The result is a panel with the integrally attached, regularly spaced stiffener sections where the mandrels exist. Conventionally, the mandrels may be of a removable type such as those employing a TEFLON material which leave hollow stiffener sections or the mandrels may be made of a lightweight material, such as foam, which remain as part of the structure.

The problem with TEFLON mandrels principally resides in the fact that they often become mechanically attached, i.e. locked on, to the composite sheets which makes it difficult for them to be removed or in the process may cause rupture of some of the composite sheets, thereby decreasing the integrity of the structure. In the instance where mandrels are retained within the structural member, the extra weight is a definite disadvantage.

BRIEF DESCRIPTION OF THE INVENTION

The present invention avoids the problems of prior art mandrels by presenting a method wherein a lightweight closed-cell material serves as a stiffener form. After curing of the composite materials, localized glass bead blasting of the foam takes place until it is completely removed from the structure, leaving hollowed channel stiffeners that increase the structural performance of the panel where they are present yet avoid the extra weight burden that is present in mandrels intended to stay within the structural member after curing.

It is emphasized that, although the present invention is explained in connection with aircraft structure, this is intended to be by way of example only and is certainly not limiting to utilization of the invention.

BRIEF DESCRIPTION OF THE FIGURE

The above-mentioned objects and advantages of the present invention will be more clearly understood when considered in conjunction with the accompanying drawing, in which:

the figure is a perspective diagrammatic illustration of the apparatus used to achieve the method of the present invention.

DETAILED DESCRIPTION OF THE INVENTION

The figure illustrates a typical composite panel 2 for use in an aircraft which includes a flat or curved sheet portion 4 and a channel-forming stiffener portion 6. As is well known in the art, panel 2 may be fabricated from a build-up of conventional pre-impregnated composite material layers forming the flat sheet portion 4. Thereafter, a foam mandrel 10 is positioned on the flat sheet portion 4 and additional layers of resin pre-impregnated composite material are wrapped over the foam mandrel 10. The end purpose of the present invention is to cure the composite layers and remove the mandrel 10 so that stiffener portion 6 serves as a structural stiffener rib for composite panel 2. A completed structure as indicated in the figure may be employed in an aircraft skin with the illustrated undersurface 8 being exposed to the exterior, while the upper illustrated surface 9 forms the skin interior.

The purpose of the present invention is to employ a plastic foam mandrel which has sufficient structural rigidity to serve as a mandrel during a forming process yet is easily removed by localized glass bead blasting so that all of the foam material is removed, leaving a hollow channel after the composite layers have been cured so that weight saving may be realized when the completed structure is employed in an end product, such as in an aircraft. The foam material must have the capability of withstanding relatively high temperatures and pressures as encountered in an autoclave during the forming of composite panel 2. One example of a suitable mandrel material is ROHACELL which is a lightweight closed cell polymethacrylimide foam.

After the curing of the composite sheets in an autoclave, removal of the foam mandrel material will result in an open channel stiffener referred to as a hat section. To accomplish mandrel material removal, direct pressure glass bead blasting is employed wherein tiny glass beads are propelled against the foam material via an air carrier. A high density glass bead is used while the blast pressure is typically 15 psi. The apparatus to be described also has an evacuating capability so that the blasted foam material of mandrel 10 and the blasting glass beads may be cleared and recovered as the channel of the stiffener section is created.

The figure indicates in schematic form the glass blasting apparatus 12 as employed in the present method. The blasting apparatus includes a nozzle generally indicated by reference numeral 14 having a hollowed cylindrical wall 16 and end 18. Apertures 20 are formed in the cylindrical wall 16 and end 18 so that glass beads can flow through the nozzle in a forward direction as well as a generally radial direction. The glass beads flowing through the nozzle are carried by a pressured airstream typically operating at 15-20 psi. As the glass beads impinge upon the foam of mandrel 10, the foam material becomes pulverized allowing deeper longitudinal penetration of the nozzle 14 through the foam mandrel 10. As the nozzle proceeds through the foam material, it becomes pulverized and, after removal, leaves a clean channel wall which constitutes a hat stiffener section 6.

The nozzle 14 is positioned within an elastomeric hose 22, the hose being of larger diameter than the nozzle so that an annular space is created therebetween. Spacers 24 may be positioned inside hose 22 to maintain an annular passageway between the hose 22 and nozzle 14. Reference numeral 26 indicates the pressurized flow of glass beads within an airstream on its way to delivery through apertures 20.

In order to remove the pulverized foam and spent glass beads, vacuum pressure is developed in the annular passageway 28 between nozzle wall 16 and hose 22. As the nozzle 14 proceeds through the created channel, the loose mandrel material and glass beads are swept into the passageway, as indicated by the arrows at reference numeral 30.

The apparatus 12 may be of the type known as a VACU-BLASTER, Model No. A20P, available from the Vacu-Blast Corporation of Belmont, Calif. In a preferred embodiment, glass beads 20–30 Mesh of a high quartz class A variety may be employed. Such beads are available from Potters Industries, Inc., of Hasbrouck Heights, N.J. Successful experiments have been conducted employing ROHACELL mandrel foam, grades 51, 71 and 110, the foam being distributed by Cyro Industries of Woodcliff Lake, N.J.

According to the previous description of the invention, it will be appreciated that a method is presented for the complete removal of a foam mandrel within a stiffener section of a composite structure after the pre-impregnated composite sheets are fully cured.

Although not described in detail herein, it is anticipated that conventional means may be provided to separate the glass beads from the mandrel foam particles. This would allow the glass beads to be recycled for continual use.

It should be understood that the invention is not limited to the exact details of construction shown and described herein for obvious modifications will occur to persons skilled in the art.

We claim:

1. A method for constructing a finished composite structural component wherein there is included at least one hollowed stiffener element, the method comprising the steps:

depositing a mandrel on a flat sheet of wet resin-impregnated material;

depositing a second sheet of resin-impregnated material over the mandrel and the flat sheet to form a stiffener;

curing the mandrel-enclosing sheets to form the structural component;

positioning a source of pressurized flow containing beads adjacent an end of the structural component;

impinging a flow of beads against the mandrel material;

pulverizing the material with the impinging beads;

progressively advancing the source into a void created within the structure resulting from material pulverization;

continuously evacuating the internal volume of the stiffener thereby clearing it of pulverized mandrel material and spent beads resulting in a thoroughly cleaned interior surface of the stiffener.

2. The method set forth in claim 1 wherein the beads are glass and the mandrel is closed cell foam.

3. The method set forth in claim 1 wherein the pressurized flow of beads is generally directed simultaneously in radial and longitudinal directions.

4. The method set forth in claim 1 wherein evacuation of spent beads occurs simultaneous with the pressurized flow, through an evacuation hose mounted concentrically with the pressurized flow source.

* * * * *

UNITED STATES PATENT AND TRADEMARK OFFICE
CERTIFICATE OF CORRECTION

PATENT NO. : 5,057,174

DATED : October 15, 1991

INVENTOR(S) : Robert Anderson, et al.

It is certified that error appears in the above-identified patent and that said Letters Patent is hereby corrected as shown below:

Column 4, line 13, change "enclosing" to --enclosed--.

Signed and Sealed this

Sixteenth Day of March, 1993

Attest:

STEPHEN G. KUNIN

*Attesting Officer*  *Acting Commissioner of Patents and Trademarks*